US010677063B2

(12) United States Patent
Hiernaux

(10) Patent No.: US 10,677,063 B2
(45) Date of Patent: Jun. 9, 2020

(54) COMPRESSOR FOR TURBINE ENGINE

(71) Applicant: SAFRAN AERO BOOSTERS SA, Herstal (BE)

(72) Inventor: Stéphane Hiernaux, Oupeye (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 0 days.

(21) Appl. No.: 16/171,456

(22) Filed: Oct. 26, 2018

(65) Prior Publication Data

US 2019/0128118 A1 May 2, 2019

(30) Foreign Application Priority Data

Oct. 26, 2017 (BE) .................................. 2017/5766

(51) Int. Cl.
| | |
|---|---|
| *F01D 5/02* | (2006.01) |
| *F04D 29/32* | (2006.01) |
| *F04D 29/68* | (2006.01) |
| *F04D 29/54* | (2006.01) |
| *F01D 5/14* | (2006.01) |

(52) U.S. Cl.
CPC ............... *F01D 5/02* (2013.01); *F01D 5/143* (2013.01); *F04D 29/321* (2013.01); *F04D 29/329* (2013.01); *F04D 29/542* (2013.01); *F04D 29/681* (2013.01); *F05D 2220/3217* (2013.01); *F05D 2240/24* (2013.01); *F05D 2250/611* (2013.01); *F05D 2250/711* (2013.01); *F05D 2250/712* (2013.01)

(58) Field of Classification Search
CPC .... F01D 5/02; F01D 5/143; F05D 2220/3217; F05D 2240/24; F05D 2250/611; F05D 2250/711; F05D 2250/712
See application file for complete search history.

(56) References Cited

U.S. PATENT DOCUMENTS

| | | | |
|---|---|---|---|
| 8,684,684 B2* | 4/2014 | Clements | ................ F01D 9/041 415/193 |
| 9,144,235 B1* | 9/2015 | Irby, Jr. | .................. A01M 31/02 |
| 2006/0233641 A1* | 10/2006 | Lee | ......................... F01D 5/143 415/208.1 |
| 2007/0258810 A1* | 11/2007 | Aotsuka | .................. F01D 5/143 415/206 |

(Continued)

FOREIGN PATENT DOCUMENTS

FR 3011888 A1 4/2015

OTHER PUBLICATIONS

Search Report dated Jul. 9, 2018 for BE 201705766.

*Primary Examiner* — Nathaniel E Wiehe
*Assistant Examiner* — Ryan C Clark
(74) *Attorney, Agent, or Firm* — James E. Walton

(57) ABSTRACT

A compressor for a turbine engine includes an annular row of blades including a first blade with an extrados surface and a second blade with an intrados surface; and a connecting surface joining the intrados surface to the extrados surface, the connecting surface having a bulge of volume VB and a recess of volume VC, the bulge and recess forming a contouring 3D. The volume of the bulge VB is greater than four times the volume VC of the recess, the connecting surface includes a flat or axisymmetric band circumferentially separating the bulge from the recess, and the bottom of the recess being formed against the intrados surface.

19 Claims, 3 Drawing Sheets

(56) References Cited

U.S. PATENT DOCUMENTS

| | | | |
|---|---|---|---|
| 2008/0267772 A1* | 10/2008 | Harvey | F01D 5/141 |
| | | | 415/191 |
| 2010/0143139 A1* | 6/2010 | Pandey | F01D 5/143 |
| | | | 416/179 |
| 2012/0201692 A1 | 8/2012 | Boston et al. | |
| 2013/0136619 A1 | 5/2013 | Passrucker et al. | |
| 2014/0044551 A1* | 2/2014 | Mahle | F01D 5/143 |
| | | | 416/223 R |
| 2015/0107265 A1 | 4/2015 | Smith et al. | |
| 2016/0208612 A1* | 7/2016 | Corcoran | F01D 5/022 |
| 2016/0230562 A1 | 8/2016 | Carrico | |
| 2017/0159444 A1 | 6/2017 | Wolfrum et al. | |

* cited by examiner

COMPRESSOR FOR TURBINE ENGINE

This application claims priority under 35 U.S.C. § 119 to Belgium Patent Application No. 2017/5766, filed 26 Oct. 2017, titled "Compressor for a Turbine Engine," which is incorporated herein by reference for all purposes.

BACKGROUND

1. Field of the Application

The present application relates to a profiled inter-blade surface of a compressor. The present application also relates to an axial turbine engine, in particular an aircraft turbojet engine or an aircraft turboprop engine.

2. Description of Related Art

The combination of a recess and a bulge in a passageway between two consecutive compressor blades makes it possible to improve the efficiency of the corresponding turbojet engine. This phenomenon is explained by a better control of the flow in the passageway, through a precise control of the secondary flows as flow convergences.

The document FR 3011888 A1 discloses a turbojet engine comprising a turbomachine compressor. Between two consecutive blades of the compressor, the platform shows a non-axisymmetric surface, also referred to as "3D Contouring", with bulges and recesses. However, the nominal flow rate of this compressor remains limited.

Although great strides have been made in the area of compressors for turbine engines, many shortcomings remain.

DETAILED DESCRIPTION OF THE PREFERRED EMBODIMENT

Figure 1:
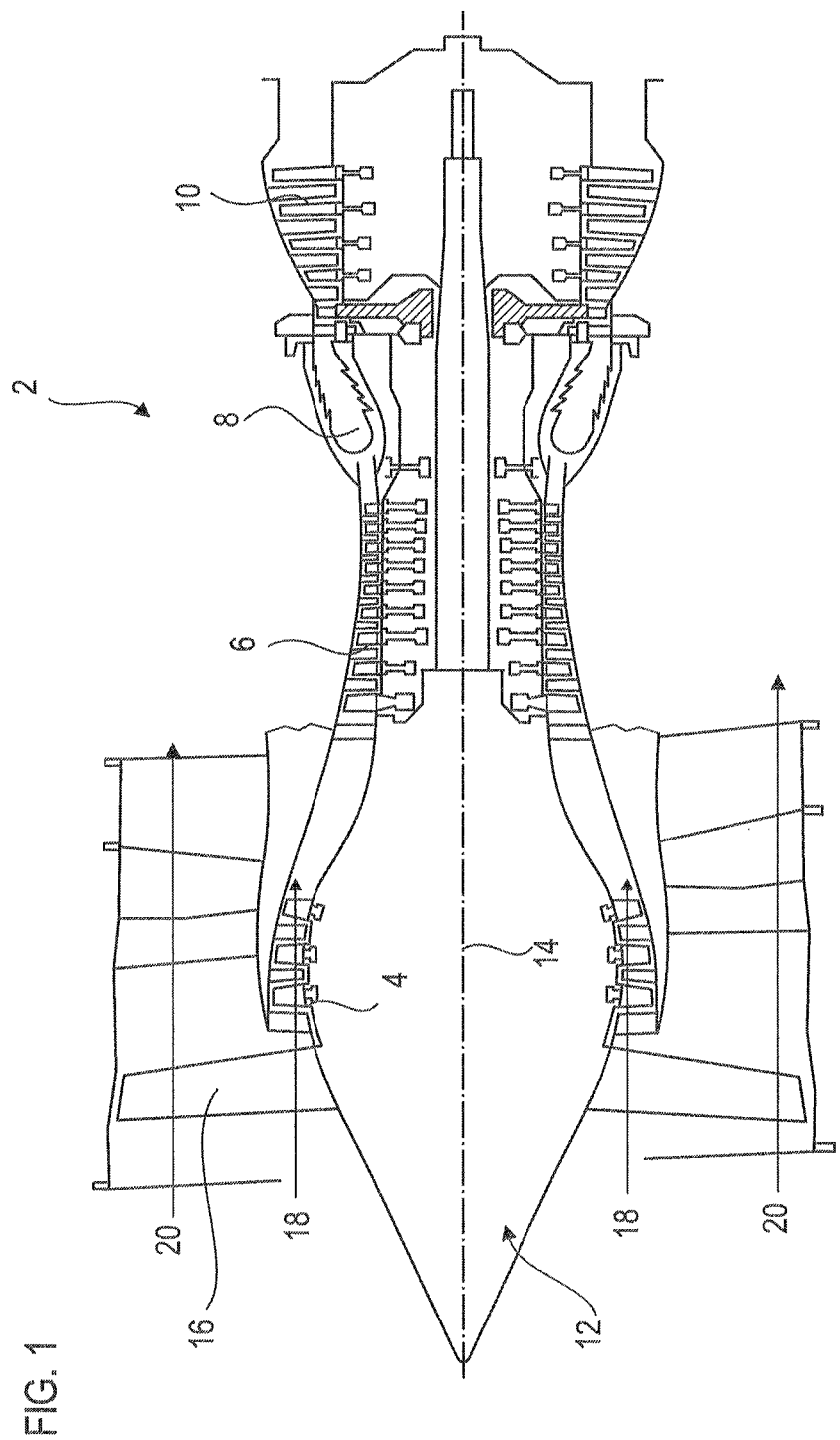
FIG. 1 shows an axial turbomachine according to the present application.

The present application aims to optimize the flow rate and the compression ratio. The present application also aims to provide a simple solution, resistant, lightweight, economical, reliable, easy to produce, convenient for maintenance and easy to inspect.

The subject of the present application is an axial turbine engine compressor, in particular a low-pressure compressor, the compressor comprising: an annular row of blades, a first blade with an extrados surface, and a second blade with an intrados surface; a connecting surface connecting the intrados surface to the extrados surface, the connecting surface having a bulge of volume VB and a recess of volume VC; wherein the volume of the bulge VB is greater than or equal to four times the volume VC of the recess. The connecting surface comprises a band of constant radius along the circumference, and circumferentially separates the recess of the bulge. The bottom of the recess is formed against the intrados surface.

According to advantageous embodiments, the compressor can comprise one or more of the following features, taken separately or according to any combinations thereof:

The ratio VB/VC is greater than or equal to ten.
The ratio VB/VC is between thirty and forty.
The bulge extends axially over the entire length of the recess.
The bulge extends over most of the connecting surface.
The bulge extends from the intrados surface.
The connecting surface comprises, according to the circumference, a half extrados side of the first blade and a half intrados side of the second blade, the top of the bulge being in the half extrados side.
The length of the recess is less than half the length of the bulge.
The average width of the bulge is greater than or equal to five times the average width of the recess.
The surface of the bulge is greater than or equal to ten times the surface of the recess.
The blades each comprise a leading edge, a trailing edge, the intrados surface and the extrados surface delimiting between them an axial passageway defined axially by the trailing edges and the leading edges, the bulge and/or the recess being enclosed in said axial passageway.
The connecting surface has an upstream half, and a downstream half in which the recess is integrated, the top of the bulge being optionally in the upstream half.
The volume VBS of the free radial half of the bulge is greater than or equal to the volume VC of the recess.
The compressor comprises a stator and a rotor rotatably mounted relative to the stator, the row of blades being secured to the stator or rotor.
The compressor comprises an annular wall on which are formed the bulge and the recess, the blades extending radially inwardly or outwardly from the annular wall, optionally the bulge extending axially over the majority of the annular wall.
The upstream face of the bulge is steeper than the downstream face; possibly at least twice.
The maximum height of the bulge is between 1% and 5% of the radial height of the first blade, and/or the maximum depth of the recess is between 0.50% and 3% of the radial height of the first blade.
The ratio VB/VC is between: 15 and 100, or 20 and 70, or 25 and 50.
The connecting surface extends from an upstream axis connecting the leading edges, and from a downstream axis connecting the trailing edges.
The connecting surface radially delimits the axial passageway and/or is continuous.
The connecting surface comprises an upstream zone, upstream of the bulge and a downstream zone, downstream of the bulge, said zones being of constant radius along the circumference.
The connecting surface has four corners, in particular arranged at the leading edges and the trailing edges, said corners defining a plane relative to which the recess and the bulge are formed.
The first blade and the second blade are consecutive blades and/or neighboring, and/or inclined circumferentially at less than 10° or less than 5°.
The blades of the annular row are circumferentially aligned; their leading edges and trailing edges are circumferentially aligned.
At the axial position of the trailing edge, the intrados surface and/or the extrados surface is parallel to the axis of rotation of the compressor.
The chord lines of the blades are at a fixed inclination with respect to the axis of rotation of the compressor.

The recess is axially away from the upstream half of the connecting surface.

The bulge and/or the recess begin(s) at axial distance from the leading edges, and end(s) at axial distance from the trailing edges.

The bulge and/or the recess is/are longer than wide.

The bulge has a constant increase in height, especially on at least a third or most of its surface.

The bulge and the recess form a relief traversed axially by the associated blade.

The bulge has two lateral edges parallel to the extrados surface.

The bulge has an upstream half in which is arranged its top.

The surface of the bulge represents at least three times the surface of the strip.

The surface of the band is greater than or equal to twice or five times the area of the recess.

The height of the bulge, and/or the depth of the recess, is/are at least: 0.05 mm, or 0.1 mm, or 0.5 mm, or 2 mm.

The height of the bulge, and/or the depth of the recess, is/are at most: 2 cm, or 1 cm, or 5 mm, or 3 mm.

The bulge has an upstream edge and/or a downstream edge generally perpendicular to the axis of rotation.

Each blade comprises a connecting radius, the connecting surface extending from the connecting radii of the first blade and the second blade.

The vertex includes a curve of constant radius around the axis of rotation.

The vertex is flat.

The recess is concave and/or forms a thinning of the annular wall.

The bulge is convex and/or forms a thickening of the annular wall.

Each blade comprises a chord line and a space between its intrados surface and said chord line, the recess and/or the bottom of the recess being predominantly or totally within said space.

Perpendicular to the chord line, the span of the recess is smaller than the span of the blade.

The subject-matter of the present application also relates to an assembly for a turbomachine compressor, in particular for a turbojet compressor, the assembly comprising a support with a relief, and a blade extending radially from the relief, remarkable in that the relief comprises a depression of volume VC and a bulge of volume VB greater than or equal to volume VC, or greater than or equal to: double or quadruple volume VC.

The subject-matter of the present application also relates to a turbomachine, in particular an aircraft turbojet, comprising a compressor and/or an assembly, which is remarkable in that the compressor is in accordance with one of the embodiments above and/or the assembly complies with the precedent paragraph, preferably the annular row comprises at least: fifty, or eighty, or one hundred blades.

Each embodiment of the present application is combinable with the other embodiments, according to all the possible technical combinations, unless explicitly mentioned otherwise.

The present application makes it possible to redirect the flow in the passageway. The importance of the bulge relative to the trough tends to partially push back the flow towards the intrados, while limiting the detachments. Thus, the flow rate through the blade grid can increase while avoiding pumping phenomena.

In the following description, the terms "internal" and "external" refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main flow direction of the flow in the turbomachine.

The width is measured along the circumference, the length is measured axially, and the height is measured radially.

FIG. 1 is a simplified representation of an axial turbomachine. It is in this case a double-flow turbojet engine. The turbojet engine 2 comprises a first compression level, called a low-pressure compressor 4, a second compression level, called a high-pressure compressor 6, a combustion chamber 8 and one or more levels of turbines 10. In operation, the mechanical power that drives the turbine 10 is transmitted via the central shaft to the rotor 12 sets in motion the two compressors 4 and 6. The latter comprise several rows of rotor blades associated with rows of stator blades. The rotation of the rotor about its axis of rotation 14 thus makes it possible to generate an air flow and to compress it progressively until it reaches the combustion chamber 8.

An inlet fan 16 is coupled to the rotor 12 and generates an air flow which splits into a primary flow 18 passing through the various aforementioned levels of the turbomachine, and into a secondary flow 20 passing through an annular duct (partially shown) along the machine to then join the primary flow at the turbine outlet.

The secondary flow can be accelerated so as to generate a thrust reaction necessary for the flight of an aircraft. The primary 18 and secondary 20 streams are coaxial annular flows and are fitted into one another. They are channeled by the casing of the turbomachine and/or by ferrules.

Figure 2:
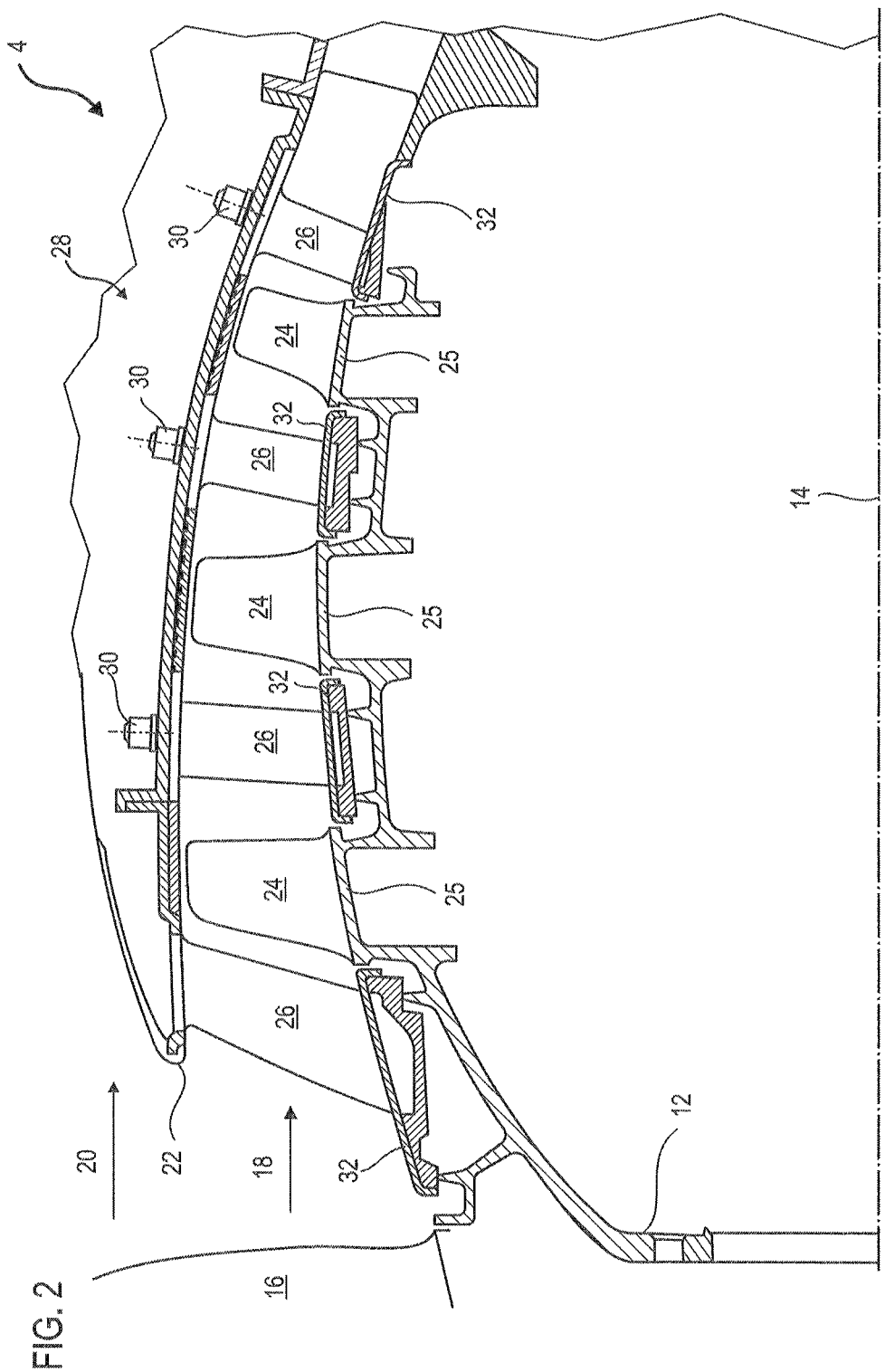
FIG. 2 is a diagram of a turbomachine compressor according to the present application.

FIG. 2 is a sectional view of a compressor of an axial turbomachine such as that of FIG. 1. The compressor can be a low-pressure compressor 4. We can see part of the fan 16 and the separation nozzle 22 of the primary flow 18 and the secondary flow 20.

The rotor 12 comprises several rows of rotor blades 24, in this case three. It may be a bladed one-piece drum (blum), or include dovetail blades. The rotor blades 24 may extend radially from an individual platform, or from an inner ring 25 of the rotor 12.

The low-pressure compressor 4 comprises several rectifiers, in this case four, each containing a row of stator blades 26. The rectifiers redirect the flow of air and are associated with the fan 16 or with a row of rotor blades to straighten the air flow, so as to convert the speed of the flow into pressure, in particular into static pressure.

The stator blades 26 extend essentially radially from an outer casing 28, and can be fixed thereto and immobilized by means of axles 30. Alternatively, the blades can be glued. They pass radially through the primary flow 18. Their blades can pass through the annular wall of the outer casing 28. Within the same row, the stator blades 26 are regularly spaced from one another and have the same angular orientation in the flow 18 Their chord lines may have a fixed inclination with respect to the axis of rotation 14. Advantageously, the blades of the same row are identical and aligned. Each row of blades (26; 24) may comprise one hundred twenty units.

Internal ferrules 32 may be suspended at the inner ends of the stator blades 26. The inner ferrules 32 may cooperate sealingly with the rotor 12 in order to improve the compression ratio of the compressor 4.

Figure 3:
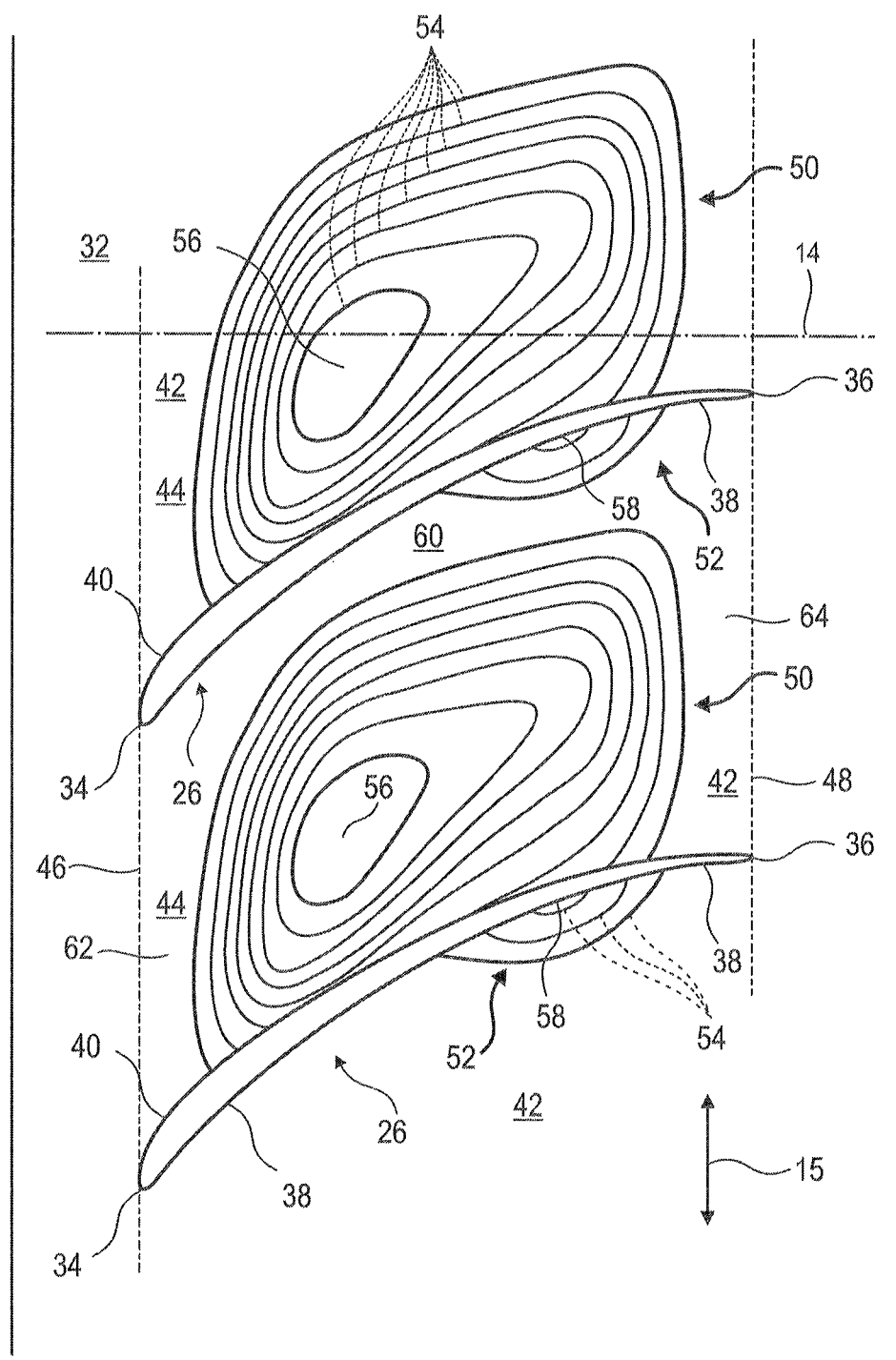
FIG. 3 illustrates a plan view of an inter-blade passageway according to the present application.

FIG. 3 sketches a support receiving two blades. The support is observed radially. Optionally, FIG. 3 is a technical drawing respecting a true scale and proportions. The circumferential direction 15 is perpendicular to the axis of rotation 14, which here symbolizes the axial direction.

The blades may be stator blades 26 such as those introduced in FIG. 2. The blades 26 may extend radially from the inner ferrule 32 which then forms the abovementioned support.

Each blade 26 comprises a leading edge 34, a trailing edge 36, an intrados surface 38 and an extrados surface 40. These surfaces (38; 40) can be curved. Each of these surfaces extends from the leading edge to the trailing edge. These surfaces (38; 40) define the camber of the blade. The blade 26 may comprise a stack of arched aerodynamic profiles, the sides of which generate the intrados surface 38 and the extrados surface 40. At the trailing edges, the contours of the profiles, in intrados and/or extrados, are parallel and or tangent to the axis of rotation 14 of the compressor.

The consecutive blades 26 of the annular row define between them an annular row of passageways 42. These passageways 42 are partitioned circumferentially by the blades 26, and delimited by the intrados and extrados surfaces. The inner ferrule 32 may have a connecting surface 44 between two consecutive blades, and the ferrule 32 connects the intrados surface 38 which is opposite the extrados surface 40 through the passageway 42. The intrados and extrados surfaces may be facing each other in the circumferential direction 15.

The connecting surface 44 may be defined axially by an upstream axis 46 and a downstream axis 48 which connect the leading edges 34 and the trailing edges 36 respectively. These axes (46; 48) can be parallel, and can generally define a parallelogram or a trapezoid. The connecting surface 44 may be generally flat. Alternatively, it may be tubular or conical, in particular because of the radius of the ferrule, and follow the optional diameter variation of the ferrule 32 along the axis of rotation 14. The connecting surface 44 may comprise four corners corresponding to the intersections between the edges (34; 36) and the ferrule.

The connecting surface 44 is profiled. It can present reliefs. At a given point of the axis of rotation 14, the radius of the connecting surface 44 can vary in the circumferential direction 15, in particular by changing between a blade 26 and its neighboring blade 26.

The connecting surface 44 may have a bulge 50, and a recess 52. The main aspect may be related to the volume, and/or the surface, and/or the height, and/or the depth. According to one embodiment, the main feature is related to the volume.

The bulge 50 as the recess 52 are represented using level lines 54. These level lines 54 show variations of level with respect to a reference surface, in this case the connecting surface 44. The bulge 50 may form a relief of height at least three times greater than the depth of the recess 52. Moreover, the extent of the bulge 50 may be at least eight times greater than the extent of the recess 52.

Also, the volume VB of the bulge 50 is greater than the volume VC of the recess 52. The ratio VB/VC corresponds to the volume of the bulge VB divided by the volume of the recess. According to the present application, the ratio VB/VC is greater than or equal to two, preferably greater than or equal to four. It can be less than 100. It can be between fifteen and sixty. It can be equal to 35+/−15, or 35+/−5.

The bulge 50 touches the extrados surface 40 of the associated blade 26. Its top 56 can be shifted circumferentially from the extrados surface 40. On the bulge 50, a collar appears between the extrados surface and the top 56. The top 56 of the bulge can be disposed in half upstream of the blade 26, and/or half upstream of said bulge 50.

Thus, the upstream face of the bulge may be more inclined relative to the axis of rotation 14 than the surface of the downstream face of the bulge. The bulge 50 may be longer than wide. It may have a parallelogram shape.

From upstream to downstream, and at the level of the bulge 50, the connecting surface 44 extends away from the axis of rotation 14 and then gets closer to it. The contour lines 54 of the bulge 50 may be evenly spaced, for example over most of the surface of the bulge 50. On this surface majority, the contour lines 54 may be parallel. The bulge 50 may have a constant increase in height, especially on at least a third or most of its surface. Radially, the bulge can be divided into a half extending from the connecting surface 44, and a half including the top 56, also called free half. The free radial half of the bulge 50 may have a volume VBS greater than the volume VC of the recess 52.

The recess 52 may be circumferentially remote from the extrados surface 40. The recess 52 may be integrated, predominantly or totally, in the downstream half of the blade 26. It may be substantially elongated. Its length may be greater than its width, possibly at least two or three times. The bottom 58 of the recess 52 can be attached to the associated intrados surface 38.

A flat or axisymmetric band 60 separates the bulge 50 from the recess 52. This band 60 can circumferentially connect the recess 52 to the bulge 50. The band 60 can be generally flat. Alternatively, it can be axisymmetric. It may extend over the entire length of the bulge 50. Outside the bulge 50 and the recess 52, the connecting surface 44 may have an upstream zone 62 and a downstream zone 64. These zones (62; 64) may be connected to each other by the band 60. The bulge 50 extends over the entire length of the recess 52, and can extend beyond, upstream and/or downstream. The upstream zone 62 and the downstream zone 64 may be delimited axially by the upstream axis 46 and the upstream edge of the bulge 50; and by the downstream edge of the bulge and the downstream axis 48; respectively.

The band 60 and/or the zones (62; 64) may each be axisymmetric. At each point of the axis of rotation 14, they have a constant radius about said axis 14. They may be formed of constant radius curves around the axis of rotation 14, the radii being perpendicular to said axis.

Although only two blades 26 are shown, the present teaching can be applied to their entire annular row, or to several or each annular row of stator blades of the compressor. Similarly, the connecting surface can be reproduced identically between each neighboring blades of the same row. This can form an annular row 50 of identical bulges and an annular row of identical recess 52.

I claim:

1. Compressor for a turbine engine, comprising:
   an annular row of blades including a first blade with an extrados surface, and a second blade with an intrados surface; and
   a connecting surface joining the intrados surface to the extrados surface, the connecting surface having a bulge with a volume VB and a recess with a volume VC;
   wherein the volume of the bulge VB is greater than or equal to four times the volume VC of the recess;
   wherein the connecting surface comprises:
   a flat or axisymmetric band circumferentially separating the bulge from the recess; and wherein the recess has a bottom that is formed against the intrados surface.

2. The compressor according to claim 1, wherein the volume of the bulge VB is equal or greater than ten times the volume of the recess VC.

3. The compressor according to claim 1, the volume of the bulge VB is between thirty and forty times the volume of the recess VC.

4. The compressor according to claim 1, wherein the recess has a length and the bulge extends axially along the length of the recess.

5. The compressor according to claim 1, wherein the bulge extends axially over more than half of the connecting surface.

6. The compressor according to claim 1, wherein the bulge extends from the extrados surface.

7. The compressor according to claim 1, wherein the connecting surface comprises:
 a first circumferential half, on the side of the extrados surface of the first blade; and
 a second circumferential half on the side of the intrados of the second blade, the bulge having a top that is arranged in the first half.

8. The compressor according to claim 1, wherein the bulge and the recess each have a respective axial length and the length of the recess is less than half of the length of the bulge.

9. The compressor according to claim 1, wherein the bulge and the recess have a respective average circumferential width, and the average circumferential width of the bulge is greater or equal to five times the average circumferential width of the recess.

10. The compressor according to claim 1, wherein the area of the bulge is greater or equal to ten times the area of the recess.

11. The compressor according to claim 1, wherein the blades each comprise:
 a leading edge; and
 a trailing edge;
 wherein the intrados surface and the extrados surface delimit between the leading edges and trailing edges a passageway delimited axially by the trailing edges and the leading edges, the bulge and/or the recess being enclosed in said passageway.

12. The compressor according to claim 1, wherein the connecting surface has an upstream half and a downstream half, the bulge having a top that is arranged in said upstream half and the recess being arranged in said downstream half.

13. The compressor according to claim 1, wherein the bulge has an upper radial half having a volume VBS and the volume VBS of the upper radial half of the bulge is greater than or equal to the volume VC of the recess.

14. The compressor according to claim 1, further comprising:
 a stator; and
 a rotor rotatably mounted relative to the stator;
 wherein the annular row of blades is integral to the stator.

15. The compressor according to claim 1, further comprising:
 an annular wall on which the bulge and the recess are formed, the annular row of blades extending radially inwardly or outwardly from the annular wall.

16. The compressor according to claim 1, wherein the bulge comprises:
 an upstream surface; and
 a downstream surface;
 wherein the upstream surface of the bulge is at least twice steeper than the downstream surface of the bulge.

17. The compressor according to claim 1, wherein the bulge has a radial height, and the first blade has a radial height, and the radial height of the bulge is between 1% and 5% of the radial height of the first blade.

18. The compressor according to claim 1, wherein the recess has a depth, and the first blade has a radial height, and the depth of the recess is between 0.50% and 3% of the radial height of the first blade.

19. A turbine engine of an aircraft, comprising:
 a compressor comprising:
 an annular row of at least fifty blades including a first blade with an extrados surface, and a second blade with an intrados surface;
 a connecting surface joining the intrados surface to the extrados surface, the connecting surface having a bulge with a volume VB and a recess with a volume VC;
 wherein the volume of the bulge VB is greater than or equal to four times the volume VC of the recess;
 wherein the connecting surface comprises:
 a flat or axisymmetric band circumferentially separating the bulge from the recess; and
 wherein the recess has a bottom that is formed against the intrados surface.

* * * * *